United States Patent
Zhang et al.

(10) Patent No.: US 10,912,129 B2
(45) Date of Patent: Feb. 2, 2021

(54) SSB MULTIPLEXING AND RMSI MONITORING IN NR-U

(71) Applicant: QUALCOMM Incorporated, San Diego, CA (US)

(72) Inventors: Xiaoxia Zhang, San Diego, CA (US); Jing Sun, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/268,278

(22) Filed: Feb. 5, 2019

(65) Prior Publication Data

US 2019/0246410 A1    Aug. 8, 2019

Related U.S. Application Data

(60) Provisional application No. 62/628,071, filed on Feb. 8, 2018.

(51) Int. Cl.
*H04W 74/08* (2009.01)
*H04W 72/04* (2009.01)
(Continued)

(52) U.S. Cl.
CPC ....... *H04W 74/0891* (2013.01); *H04L 5/0048* (2013.01); *H04L 5/0053* (2013.01);
(Continued)

(58) Field of Classification Search
CPC ............. H04W 74/0891; H04W 28/18; H04W 72/1263; H04L 5/0053; H04L 5/0096
See application file for complete search history.

(56) References Cited

U.S. PATENT DOCUMENTS

| | | | | |
|---|---|---|---|---|
| 2019/0149383 A1* | 5/2019 | Ko | ........................ | H04L 5/0053 370/329 |
| 2019/0159203 A1* | 5/2019 | Kim | ...................... | H04L 5/0053 |

OTHER PUBLICATIONS

Intel Corporation: "RMSI Contents and Delivery Mechanism", 3GPP Draft; R1-1716278 Intel RMSI, 3rd Generation Partnership Project (3GPP), vol. RAN WG1, No. Nagoya, Japan; Sep. 18, 2017-Sep. 21, 2017, Sep. 17, 2017 (Sep. 17, 2017), pp. 1-6, XP051339734, Retrieved from the Internet: URL: http://www.3gpp.org/ftp/Meetings_3GPP_SYNC/RAN1/Docs/ [retrieved on 2Sep. 17, 2017], Sections 2, 4.

(Continued)

*Primary Examiner* — Ashley Shivers
(74) *Attorney, Agent, or Firm* — Liem T. Do

(57) ABSTRACT

Synchronization signal block (SSB) multiplexing and remaining material system information (RMSI) monitoring in new radio unlicensed (NR-U) networks are disclosed. For SSB multiplexing, a user equipment (UE) receives an SSB configuration for a discovery signal detection window having a plurality of communication slots, wherein, based on the SSB configuration, UE identifies random access resource and time and frequency locations to monitor remaining minimum system information (RMSI) configured for each SSB. The UE further receives an SSB transmission indicator that reflects a listen before talk (LBT) result, which it may use with the SSB configuration to map one or more SSB for rate matching in selected slots. The UE can then rate match any data transmissions around the identified SSBs in those identified slots regardless of LBT result. The UE may further leverage the SSB configuration and indication of LBT result to monitor SSB transmissions for control resource set (CORESET) transmissions.

28 Claims, 13 Drawing Sheets

(51) Int. Cl.
*H04W 28/18* (2009.01)
*H04W 72/12* (2009.01)
*H04L 5/00* (2006.01)

(52) U.S. Cl.
CPC ........... *H04L 5/0096* (2013.01); *H04W 28/18* (2013.01); *H04W 72/0446* (2013.01); *H04W 72/1263* (2013.01)

(56) References Cited

OTHER PUBLICATIONS

International Search Report and Written Opinion—PCT/US2019/016904—ISA/EPO—dated Jun. 17, 2019.
Sony: "Remaining Details on Remaining Minimum System Information", 3GPP Draft; R1-1720453_RMSI_Final, 3rd Generation Partnership Project (3GPP), vol. RAN WG1, No. Reno, USA; Nov. 11, 2017-Dec. 1, 2017, Nov. 18, 2017, (Nov. 18, 2017), 6 pages, XP051370005, Retrieved from the Internet: URL: http://www.3gpp.org/ftp/tsg_ranWG1_RL1/TSGR1_91/Docs/ [retrieved on Nov. 18, 2017], Section 1.

* cited by examiner

SSB MULTIPLEXING AND RMSI MONITORING IN NR-U

CROSS-REFERENCE TO RELATED APPLICATIONS

This application claims the benefit of U.S. Provisional Patent Application No. 62/628,071, entitled, "SSB MULTIPLEXING AND RMSI MONITORING IN NR-U," filed on Feb. 8, 2018, which is expressly incorporated by reference herein in its entirety.

BACKGROUND

Field

Aspects of the present disclosure relate generally to wireless communication systems, and more particularly, to synchronization signal block (SSB) multiplexing and remaining material system information (RMSI) monitoring in new radio unlicensed (NR-U) networks.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication, includes receiving, by a UE, a synchronization signal block (SSB) configuration for a discovery signal detection window having a plurality of communication slots, wherein based on the SSB configuration, UE identifies random access resource and the time and frequency locations to monitor remaining minimum system information (RMSI) configured for each SSB, receiving, by the UE, an SSB transmission indicator, mapping, by the UE, the SSB configuration using the SSB transmission indicator to determine one or more SSB for rate matching in one or more slots of the plurality of communication slots, and rate matching, by the UE, data transmission around each of the one or more SSBs in the one or more slots.

In an additional aspect of the disclosure, a method of wireless communication includes receiving, by a UE, a SSB configuration for a discovery signal detection window having a plurality of communication slots, monitoring, by the UE, for a control resource set (CORESET) based on a beginning of transmissions within the discovery signal detection window, and decoding, by the UE, the CORESET for system information.

In an additional aspect of the disclosure, an apparatus configured for wireless communication includes means for receiving, by a UE, an SSB configuration for a discovery signal detection window having a plurality of communication slots, wherein based on the SSB configuration, UE identifies random access resource and the time and frequency locations to monitor RMSI configured for each SSB, means for receiving, by the UE, an SSB transmission indicator, means for mapping, by the UE, the SSB configuration using the SSB transmission indicator to determine one or more SSB for rate matching in one or more slots of the plurality of communication slots, and means for rate matching, by the UE, data transmission around each of the one or more SSBs in the one or more slots.

In an additional aspect of the disclosure, an apparatus configured for wireless communication includes means for receiving, by a UE, a SSB configuration for a discovery signal detection window having a plurality of communication slots, means for monitoring, by the UE, for a CORESET based on a beginning of transmissions within the discovery signal detection window, and means for decoding, by the UE, the CORESET for system information.

In an additional aspect of the disclosure, a non-transitory computer-readable medium having program code recorded thereon. The program code further includes code to receive, by a UE, an SSB configuration for a discovery signal detection window having a plurality of communication slots, wherein based on the SSB configuration, UE identifies random access resource and the time and frequency locations to monitor RMSI configured for each SSB, code to receive, by the UE, an SSB transmission indicator, code to map, by the UE, the SSB configuration using the SSB transmission indicator to determine one or more SSB for rate matching in one or more slots of the plurality of communication slots, and code to rate match, by the UE, data transmission around each of the one or more SSBs in the one or more slots.

In an additional aspect of the disclosure, a non-transitory computer-readable medium having program code recorded thereon. The program code further includes code to receive, by a UE, a SSB configuration for a discovery signal detection window having a plurality of communication slots, code to monitor, by the UE, for a CORESET based on a beginning of transmissions within the discovery signal detection window, and code to decode, by the UE, the CORESET for system information.

In an additional aspect of the disclosure, an apparatus configured for wireless communication is disclosed. The apparatus includes at least one processor, and a memory coupled to the processor. The processor is configured to receive, by a UE, an SSB configuration for a discovery signal detection window having a plurality of communication slots, wherein based on the SSB configuration, UE identifies random access resource and the time and frequency locations to monitor RMSI configured for each SSB, to receive, by the UE, an SSB transmission indicator, to map, by the UE, the SSB configuration using the SSB transmission indicator to determine one or more SSB for rate matching in one or more slots of the plurality of communication slots, and to rate match, by the UE, data transmission around each of the one or more SSBs in the one or more slots.

In an additional aspect of the disclosure, an apparatus configured for wireless communication is disclosed. The apparatus includes at least one processor, and a memory coupled to the processor. The processor is configured to receive, by a UE, a SSB configuration for a discovery signal detection window having a plurality of communication slots, to monitor, by the UE, for a CORESET based on a beginning of transmissions within the discovery signal detection window, and to decode, by the UE, the CORESET for system information.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
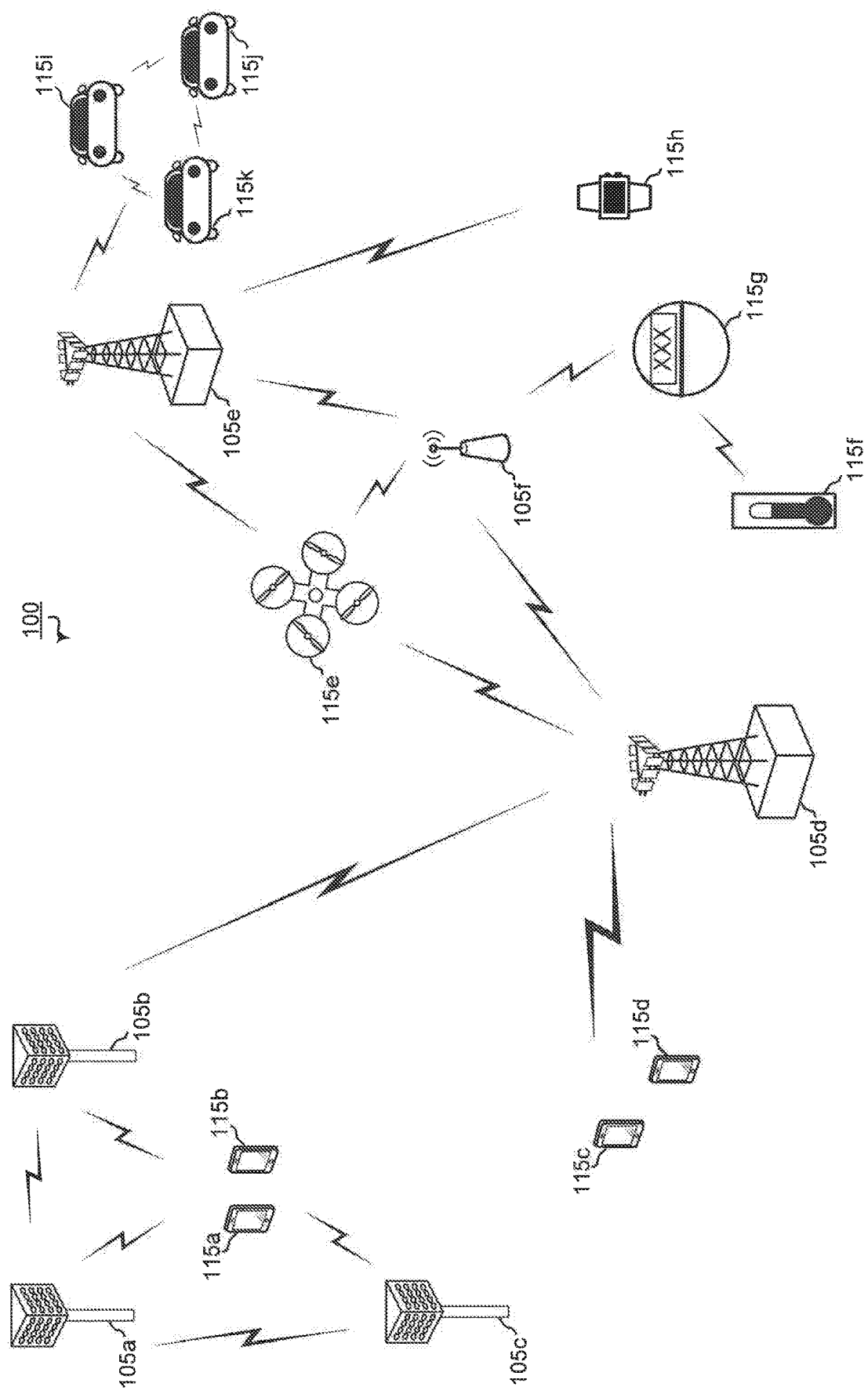
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
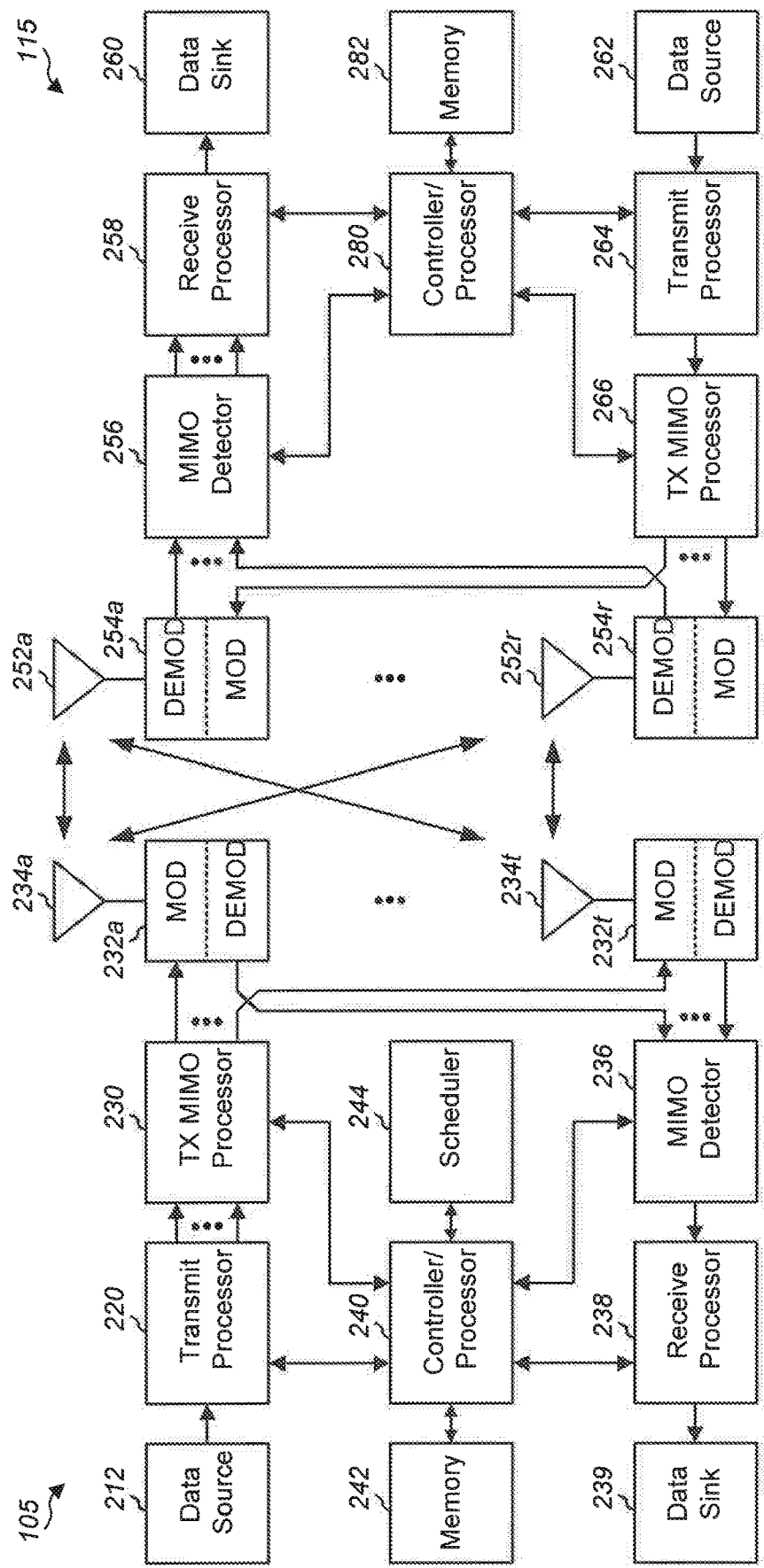
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 4 and 9, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
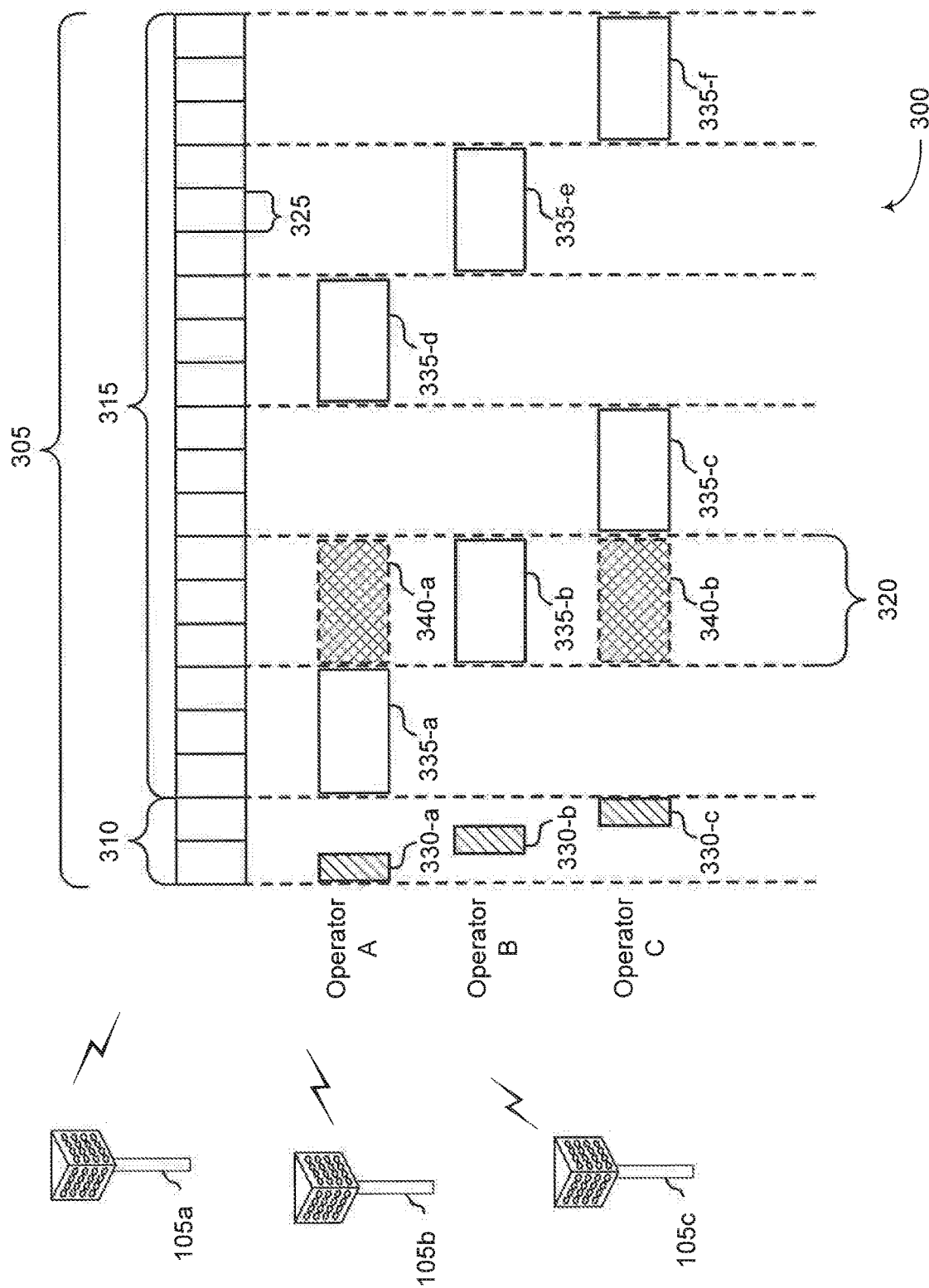
FIG. 3 is a block diagram illustrating a wireless communication system including base stations that use directional wireless beams.

FIG. 3 illustrates an example of a timing diagram 300 for coordinated resource partitioning. The timing diagram 300 includes a superframe 305, which may represent a fixed duration of time (e.g., 20 ms). Superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g, UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B, resources 335-c may be prioritized for Operator C, resources 335-d may be prioritized for Operator A, resources 335-e may be prioritized for Operator B, and resources 335-f may be prioritized for operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-a without interference from the wireless nodes of Operator B or Operator C.

A network operating entity may additionally signal to another operator that it intends to use a particular G-INT. For example, referring to resources 335-a, Operator A may signal to Operator B and Operator C that it intends to use resources 335-a. Such signaling may be referred to as an activity indication. Moreover, since Operator A has priority over resources 335-a, Operator A may be considered as a higher priority operator than both Operator B and Operator C. However, as discussed above, Operator A does not have to send signaling to the other network operating entities to ensure interference-free transmission during resources 335-a because the resources 335-a are assigned with priority to Operator A.

Similarly, a network operating entity may signal to another network operating entity that it intends not to use a particular G-INT. This signaling may also be referred to as an activity indication. For example, referring to resources 335-b, Operator B may signal to Operator A and Operator C that it intends not to use the resources 335-b for communication, even though the resources are assigned with priority to Operator B. With reference to resources 335-b, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-b may be considered an opportunistic interval (O-INT) for Operator A (e.g., O-INT-OpA). For illustrative purposes, resources 340-a may represent the O-INT for Operator A. Also, from the perspective of Operator C, the same sub-interval 320 may represent an O-INT for Operator C with corresponding resources 340-b. Resources 340-a, 335-b, and 340-b all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-b (e.g., G-INT-OpB), then Operator A may use those same resources (e.g., represented by resources 340-a) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-b) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources).

Such unassigned resources may be considered an O-INT for any network operating entity, and may be accessed on an opportunistic basis as described above.

In some examples, each subframe 325 may contain 14 symbols (e.g., 250-μs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-NTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

New radio (NR) supports multiple synchronization signal block (SSB) transmission (up to L) within a single burst set or transmission opportunity. For example, with a carrier frequency range of up to 3 GHz, the maximum number of SSB transmissions may be four (L=4). Additionally, with a carrier frequency range from 3 GHz to 6 GHz, the maximum number of SSB transmission may be eight (L=8). Moreover, with a carrier frequency range from 6 GHz to 52.6 GHz, the maximum number of SSB transmission may be eight (L=64). A given base station may not actually transmit the maximum number of SSB transmissions available with the burst set or transmission opportunity. The base station may communicated an indication of the number of actually transmitted SSBs in downlink control signaling, such as the remaining material system information (RMSI) message, for both sub-6 GHz and above-6 GHz carrier frequency cases.

For sub-6 GHz cases, a full bitmap (e.g., 8 bits) may be used to indicate the actual SSB transmissions. Above-6 GHz cases may, instead, use a compression method identifying a group-bitmap (8 bits) in addition to a bitmap in group signal (8 bits). The group bitmap would be defined as identifying a certain number of consecutive SSBs, while the bitmap in group signal can indicate which SSB is actually transmitted within the group, where each group may have the same pattern of SSB transmission, and the group bitmap can indicate which group is actually transmitted. Alternatively, a UE-specific radio resource control (RRC) signal with a full bitmap may be used for indicating the actually transmitted SSBs for both sub-6 GHz and above-6 GHz cases.

The base station reserves indicated resources for the actually transmitted SSBs. Any data channels present may be rate matched around the actually transmitted SSBs. With the rate matching operation, for UE-specific PDSCH and UE-specific control resource set (CORESET), if the UE has received no bitmap through RRC signalling, the UE may assume SSB transmission according to the signalling in RMSI. However, if the UE has received a bitmap through RRC signalling, the UE assumes SSB transmission according to the bitmap in the RRC-based signalling. For PDSCH carrying RMSI and the corresponding PDCCH CORESET, the UE may assume that no SSB is transmitted in the allocated resources.

In shared or unlicensed spectrum deployments, the base station may first perform a listen before talk (LBT) operation before SSB. Depending on the LBT outcome, the base station may or may not be able to begin transmission of the SSB immediately from slot 0 of the discovery reference signal (DRS) measurement timing configuration (DMTC) window. The DMTC is a periodically occurring time window during which the UE expects to receive the DRS in unlicensed operations. In such a case, where the base station may not be able to begin SSB transmission at slot 0, it is currently unclear how the base station may signal the SSB bitmap to indicate the actually transmitted SSBs for rate matching, as the base station cannot reliably determine when it can transmit SSBs. Various aspects of the present disclosure reflect how to multiplex SSBs with other channels considering the impact of LBT procedures in unlicensed spectrum.

Figure 4:
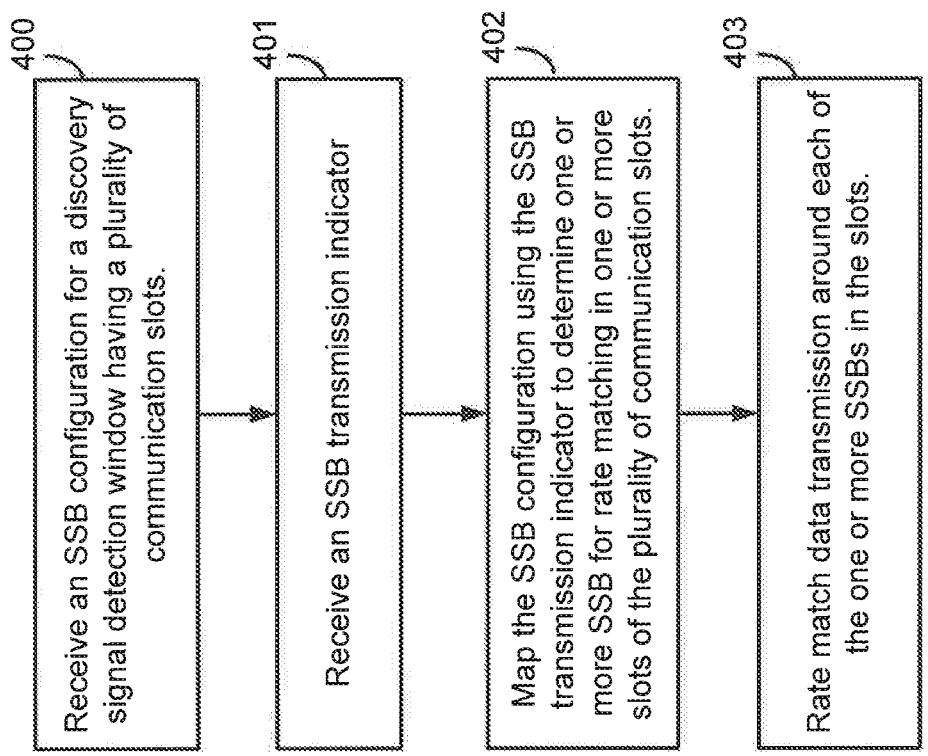
FIG. 4 is a block diagram illustrating example blocks executed to implement one aspect of the present disclosure.
Figure 13:
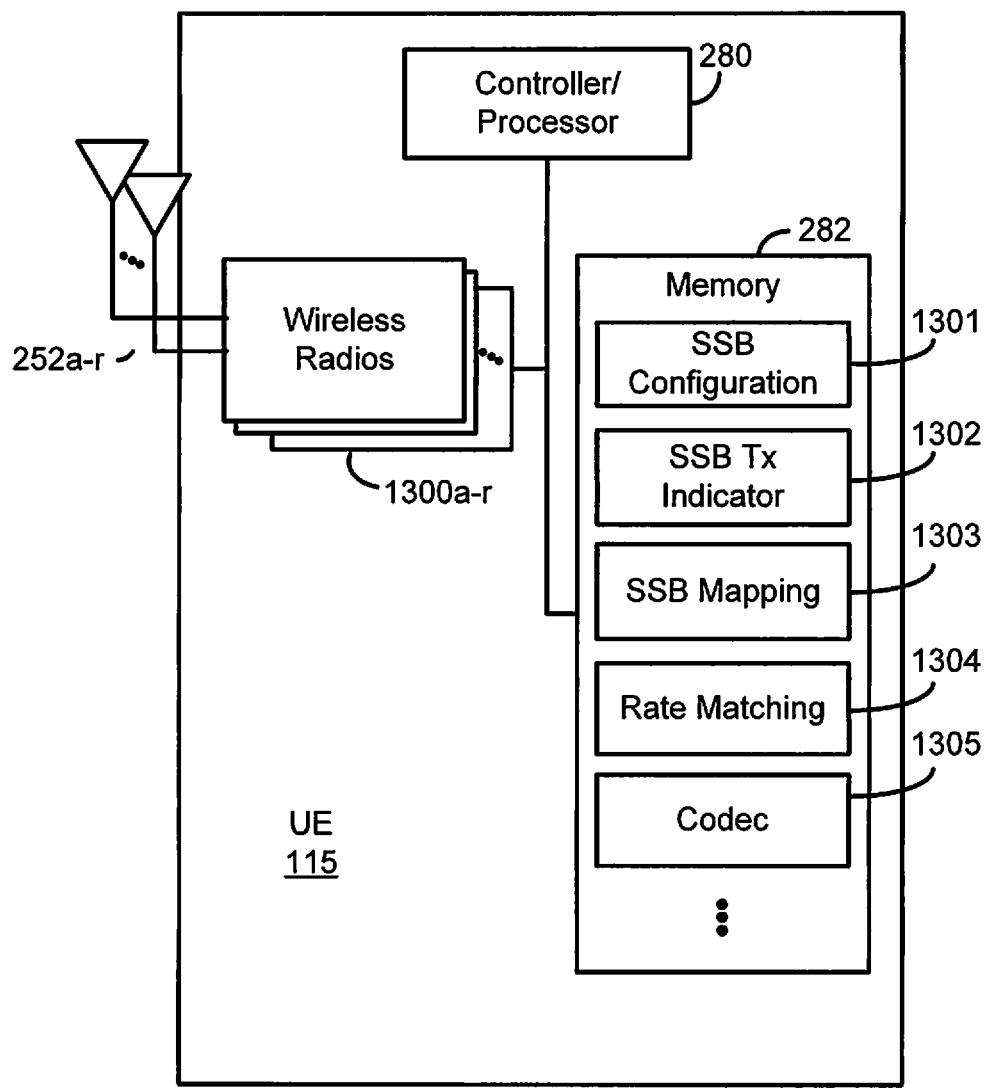
FIG. 13 is a block diagram illustrating detail of an example UE configured according to one aspect of the present disclosure.

FIG. 4 is a block diagram illustrating example blocks executed to implement one aspect of the present disclosure. The example blocks will also be described with respect to UE 115 as illustrated in FIG. 13. FIG. 13 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1300a-r and antennas 252a-r. Wireless radios 1300a-r includes various components and hardware, as illustrated in FIG. 2 for UE 115, including modulator/demodulators 254a-r, MIMO detector 256, receive processor 258, transmit processor 264, and TX MIMO processor 266.

At block 400, a UE receives an SSB configuration for a discovery signal detection window having a plurality of communication slots, where based on the SSB configuration, UE identifies random access resource and the time and frequency locations to monitor RMSI. For example, UE 115 may receive the SSB configuration from the serving base station via antennas 252*a-r* and wireless radios 1300*a-r*, and store the configuration information in memory 282 at SSB configuration 1301. The SSB configuration may include various different elements depending on the example implementation. For example, the SSB configuration may include an SSB bitmap that identifies which of the scheduled SSB are actually transmitted. The SSB bitmap may be transmitted with the RMSI or may be included in RRC signaling. Additional example implementations may include the SSB configuration as an identification of the downlink resources for each potential SSB location within the burst set or transmission opportunity.

At block 401, the UE receives an SSB transmission indicator. UE 115 may receive the SSB transmission indicator via antennas 252*a-r* and wireless radios 1300*a-r* and store the information in memory 282 at SSB transmission indicator 1302. The SSB transmission indicator may either directly indicate SSB transmissions or may provide information to be used by the UE to determine SSB transmissions. For example, the SSB transmission indicator may identify the beginning of transmissions within the DTMC, when the base station has successfully completed the LBT procedure. In additional example implementations, the SSB transmission indicator may provide the beginning of the DTMC window. In still further example implementations, the SSB transmission indicator may indicate that there will be a cyclical extension of the SSB to accommodate the schedule of actual transmissions considering the LBT procedure. Additional example implementations may provide identification of a subset of downlink resources that are involved in the actual transmission of SSB. The SSB transmission indicator may be communicated via a preamble, a common control channel (e.g., CPDCCH), a downlink grant, or the like.

At block 402, the UE maps the SSB configuration using the SSB transmission indicator to determine one or more SSB for rate matching in one or more slots of the plurality of communication slots. Under control of controller/processor 280, UE 115 executes SSB mapping logic 1303, stored in memory 282, to map SSB configuration 1301 using SSB transmissions indicator 1302. The execution environment of SSB mapping logic 1303 allows UE 115 to use SSB transmission indicator 1302 and SSB configuration 1301, in memory 282, to determine the actually transmitted SSB. For example, when the schedule of SSB transmission index will float with the success of the LBT, using the identifier indicating the beginning of transmissions within the DTMC, the UE can map the beginning of transmission onto the SSB bitmap to determine which slots include the actual SSB transmissions. Similarly, if the scheduled SSB transmission index does not float with the LBT success, the UE can still map actual SSB transmissions to the bitmap using the beginning of transmissions. However, without a floating schedule, the bitmap used by the UE will be cyclically extended. In additional implementations, with identification of resource for all potential SSB locations, the UE may determine the actual SSB transmission using the indication of resources used for SSB transmissions.

At block 403, the UE rate matches data transmissions around each of the one or more SSBs in the one or more slots. During the burst set or transmission opportunity, data may be multiplexed onto the same slots as the actual SSB transmissions. However, the data is rate matched around the actual SSB transmissions. For example, UE 115, under control of controller/processor 280, executes rate matching logic 282, stored in memory 282. The execution environment of rate matching logic 1304 allows UE 115 to differentiate the transmission of data from the SSB transmissions within the same slot.

Figure 5:
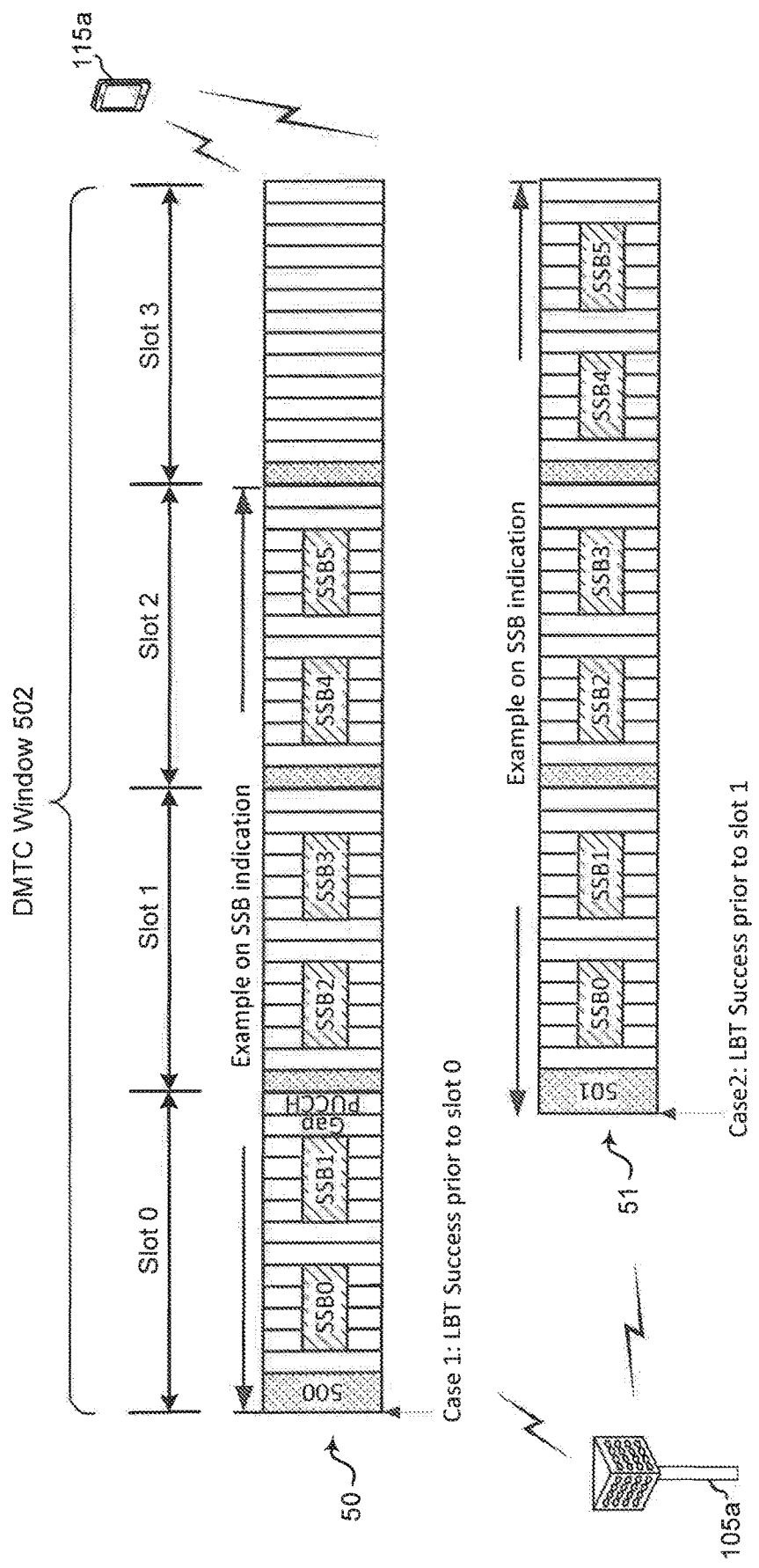
FIG. 5 is a block diagram illustrating a base station and a UE configured according to one aspect of the present disclosure.

FIG. 5 is a block diagram illustrating a base station 105*a* and UE 115*a* configured according to one aspect of the present disclosure. In a first optional aspect, the scheduled SSB transmissions may float with the LBT result. Base station 105*a* indicates an SSB bitmap via either RMSI or UE-specific RRC signaling. Note the SSB bitmap does not necessarily correspond to the actually transmitted SSBs. Instead, UE obtains the actually transmitted SSBs by taking into the indicated SSB bitmap (via either RMSI or UE-specific RRC signaling) together with the SSB transmission indicator. Two SSB may be transmitted in each slot of a DMTC, such as DMTC window 502. As base station 105*a* detects a successful LBT, it will transmit an SSB transmission indicator, such as a preamble or common control signal (e.g, CPDCCH) at 500/501, to indicate the start of transmissions in DMTC window 502.

Base station 105*a* transmits an SSB bitmap of 11111100. This SSB bitmap indicates that base station 105*a* will transmit the first 6 SSBs. In transmission stream 50, base station 105*a* passes the LBT prior to slot 0. Accordingly, at 500, base station 105*a* transmits a preamble or CPDCCH indicating the beginning of transmissions in the DMTC window. Base station 105*a* then transmits the SSB according to the SSB bitmap (e.g., SSB0-SSB1 in slot 0, SSB2-SSB3 in slot 1, and SSB4-SSB5 in slot 2). UE 115*a* maps the signaled SSB bitmap together with the preamble or CPDCCH to determine the actually transmitted SSBs for rate matching.

In transmission stream 51, base station 105*a* passes the LBT prior to slot 1. In the illustrated example, the SSB indication floats with the LBT results. As such, SSB transmission follows the SSB bitmap shifted to the beginning of slot 1. For example, SSB0 and SSB1 are still transmitted in the slot 1 and SSB4 and SSB5 will transmit on slot 3, causing rate matching around SSBs to occur in slot 3.

It should be noted that in the illustrated aspect, the SSB transmission indication of 500/501 would generally have deep penetration to reach all neighboring UEs with all beamforming directions. Alternatively, the downlink grant can indicate the start timing of transmission in DMTC 502 for UE 115*a* to map the signaled SSB bitmap for rate matching.

Figure 6:
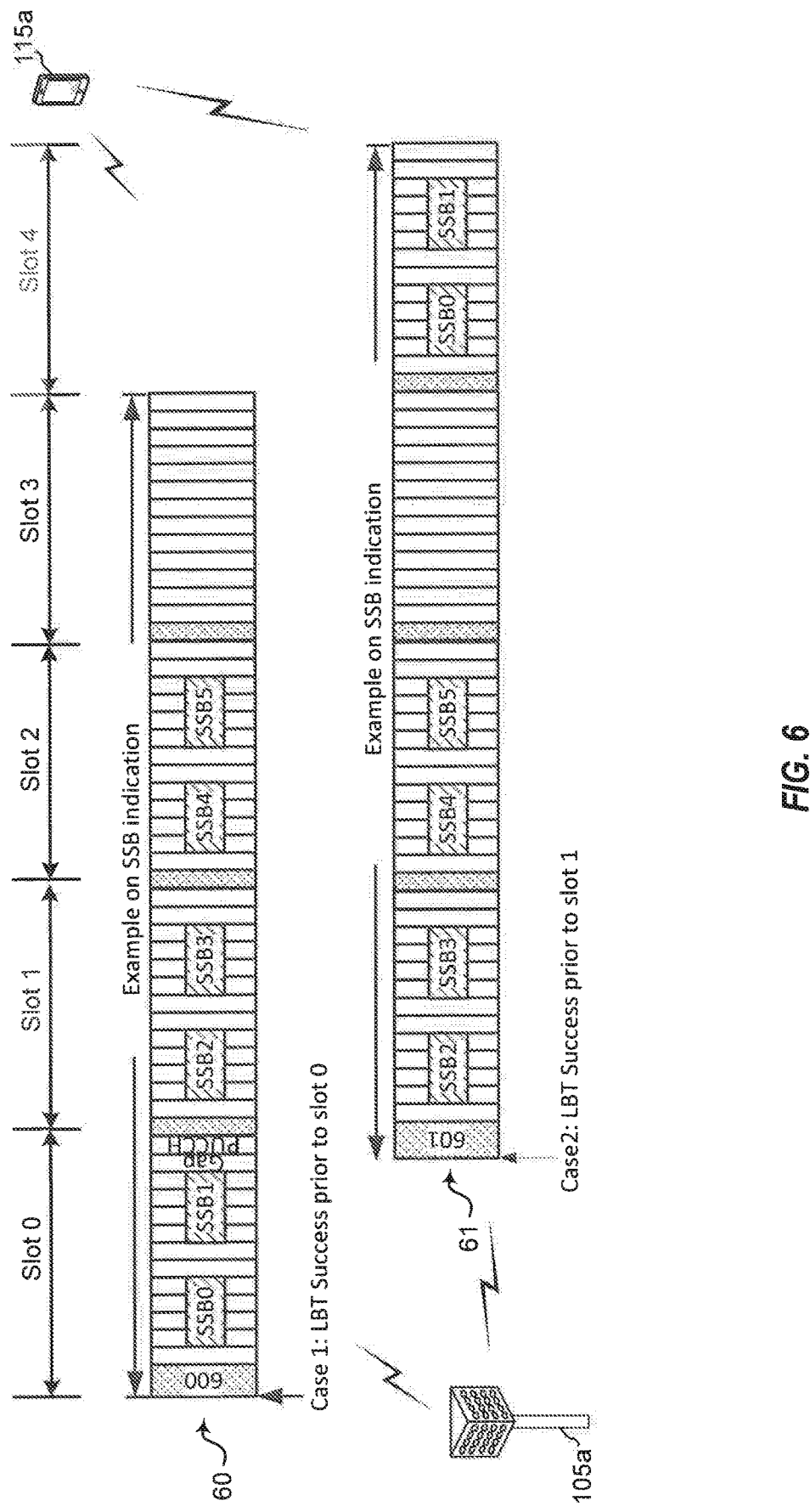
FIG. 6 is a block diagram illustrating a base station and a UE configured according to one aspect of the present disclosure.

FIG. 6 is a block diagram illustrating a base station 105*a* and UE 115*a* configured according to one aspect of the present disclosure. In a next optional aspect, the scheduled SSB transmission may wrap-around or cyclically extend based on the LBT result. Base station 105*a* may indicate the SSB bitmap in either RMSI or UE-specific RRC signaling. In the illustrated example, base station 105*a* transmits an SSB bitmap of 11111100. As base station 105*a* detects a successful LBT, it may also transmit an SSB transmission indication (e.g., a preamble or common control signal) at 600/601 to indicate the start of transmissions in the DMTC window. Upon detection of a successful LBT, the SSB bitmap can be cyclically extended depending on SSB transmission indication 600/601 to cover a full cycle of L beams. UE 115*a* may extend the SSB bitmap together with the SSB transmission indication at 600/601, into the actually transmitted SSBs for rate matching.

In transmission stream 60, base station 105*a* detects a successful LBT prior to slot 0. SSB transmission indicator 600 identifies the beginning of transmission within the DTMC window. Base station 105*a* may follow the SSB bitmap for transmitting SSB beginning at slot 0. In transmission stream 61, base station 105a detects a successful LBT prior to slot 1. However, UE 115a does not shift the SSB bitmap to slot 1, but instead cyclically extends the SSB bitmap (e.g., bitmap 11111100 is cyclically extended to become 11110011. Transmissions of SSB occur according to the cyclically extended SSB bitmap, in which SSB2 and SSB3 are transmitted in slot 1, SSB4 and SSB5 transmitted in slot 2, no SSB transmissions in slot 3, and SSB0 and SSB1 are transmitted in slot 4. UE 115a will accordingly rate match data transmissions in slots 1, 2, and 4, around SSB0-SSB5.

It should be noted that, similarly to the first optional aspect, the SSB transmission indication (e.g., preamble/CPDCCH) may have deep penetration to reach all neighboring UEs with all beamforming directions.

Alternatively, the downlink grant communicated from base station 105a can indicate the start timing of transmissions within the DTMC window or may indicate the SSB cyclic extension is activated or deactivated for each SSB or SSB group for rate matching. For example, the grant can indicate SSB1 is not cyclically extended (SSB1 will only show up on the NR SSB1 location) or SSB0 is cyclically extended once (SSB0 does not show up on the NR SSB0 location but shows up on the extended place with one extension) so that UE 115a obtains the actual SSB location.

Figure 7:
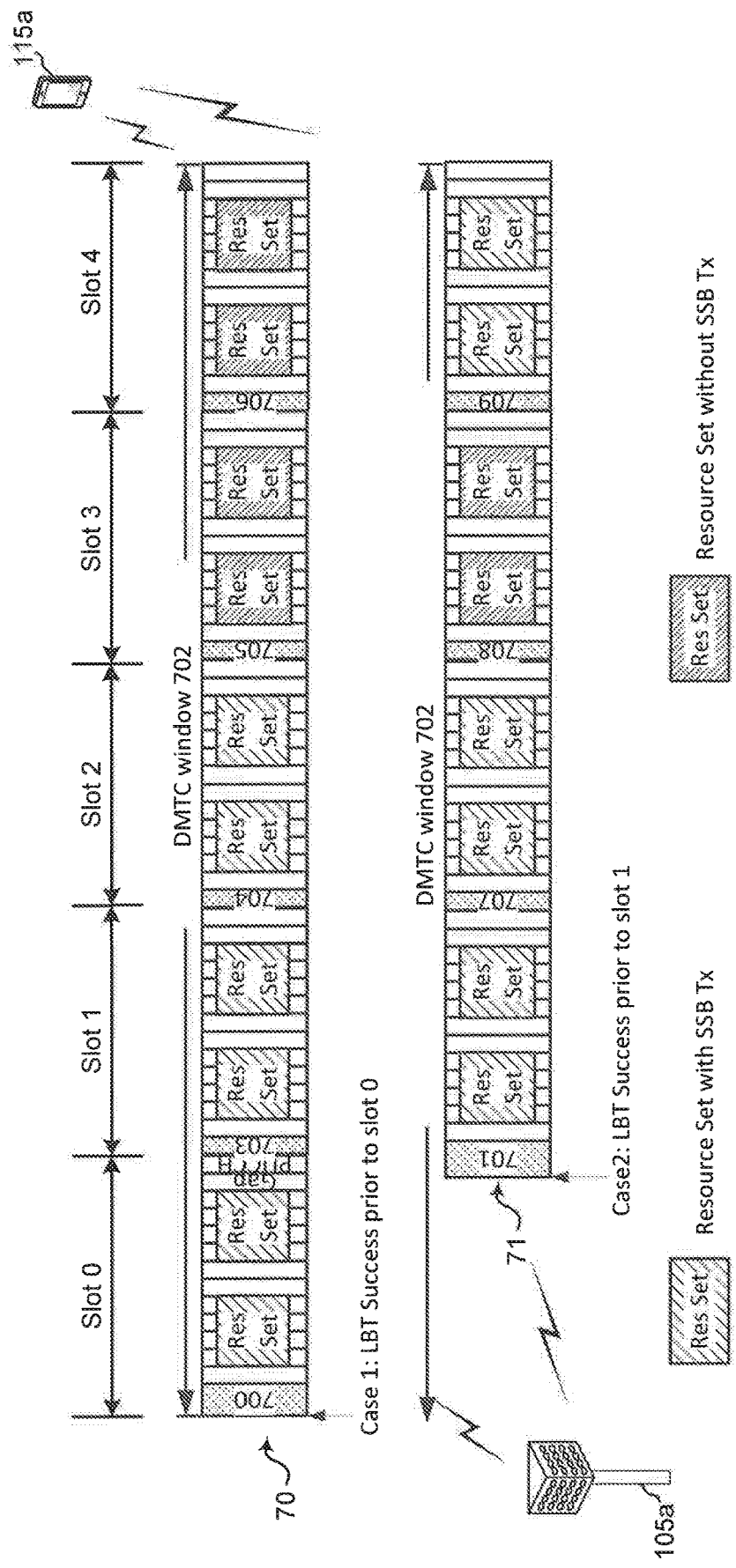
FIG. 7 is a block diagram illustrating a base station and a UE configured according to one aspect of the present disclosure.

FIG. 7 is a block diagram illustrating a base station 105a and UE 115a configured according to one aspect of the present disclosure. In a next optional aspect, UE 115a may receive the SSB configuration that includes identification of the downlink resource sets which span the SSB locations within the entire DMTC window 702. The number of potential SSB locations within DMTC window 702 may exceed the maximum number, L, depending on the length of DMTC window 702. For example, with a 240 KHz SSB subcarrier spacing (SCS), base station 105a can accommodate up to 64 SSBs within 2.5 ms. If the length of DMTC window 702 can be up to 10 ms, 64*4 potential SSB locations can be found within DMTC window 702, even though base station 105a would only transmit up to L such SSBs.

Within the RMSI or through RRC signaling (not shown), UE 115a receives the SSB configuration, which identifies this location (set of resources) of each possible SSB transmission over DMTC window 702. In transmission stream 70, wherein base station 105a detects a successful LBT prior to slot 0, SSB transmission indication signals 700, 703-706 (e.g., preamble, PDCCH, etc.) indicates whether the data transmissions (e.g., PDSCH) in slot 0 should rate match around the configured resource sets or not. Thus, the SSB transmission indication signals 700, 703-706 identify to UE 115a whether the actually transmitted SSB are within the potential SSB location resources identified in the SSB configuration. UE 115a is, therefore, able to map the SSB configuration information to the actually-transmitted SSB locations using the SSB transmission indication signals 700, 703-706 that identify whether the potential resources for SSB should be rate matched around in the slot. In this case, the SSB indication can be transmitted in a downlink grant (e.g., PDCCH).

In transmission stream 71, base station 105a detects a successful LBT prior to slot 1. As illustrated, base station 105a may elect to transmit the first two scheduled SSB transmission in slot 4, because the channel was not yet secured in slot 0. SSB transmission indication signals 701, 707-709 identify to UE 115a which of the possible SSB location resources identified in the SSB configuration will need to be rate matched and which will not. With the shift in transmission of the first two scheduled SSB to slot 4, SSB transmission indication signal 709 will indicate to UE 115a to rate match around the identified SSB transmission locations.

When the number of bits in SSB transmission indication 700 (e.g., PDCCH) for resource set rate matching is smaller than the potential number of SSBs within the assignment, multiple SSBs can be grouped together. For example, if SSB transmission indication 700 has a 2-bit indication for a resource set rate matching while the data assignment includes four SSBs, two of the four SSBs can be grouped together for a single bit indication.

As noted above, in unlicensed/shared spectrum, a base station may not be able to check out or secure the medium before the scheduled start of the DMTC window and, thus, may not be able to transmit some scheduled SSBs due to the timing of the LBT outcome. This is especially true when the base station indicates a subset of SSBs as the actually transmitted SSBs. The base station may choose to indicate all potential, L, SSBs as the actually transmitted SSBs to increase the SSB transmission probability. However, this implies that the base station would need to allocate the corresponding PRACH resources for all L SSBs, which would result in substantial increase in system overhead.

The base station may indicate the actually transmitted SSB via an SSB bitmap, for example, 11110000. In this example, a 30 KHz SCS is used for SSB numerology with up to eight SSBs that can be transmitted by the base station within the DTMC window. In general, the base station would perform an extended CCA (ECCA) with a high priority class contention window (CW) and would be allowed to begin transmissions up to 2 ms after detecting LBT success. If LBT success occurs too late to transmit in slot 0, the base station obtains the medium for transmission on slot 1, but misses the transmission locations for SSB0 and SSB1, according to the SSB bitmap. As a result, the base station would only transmit SSB2 and SSB3 instead of transmitting all four scheduled SSBs. Various additional aspects of the present disclosure are directed to opportunistic SSB transmission in NR-U.

Figure 8:
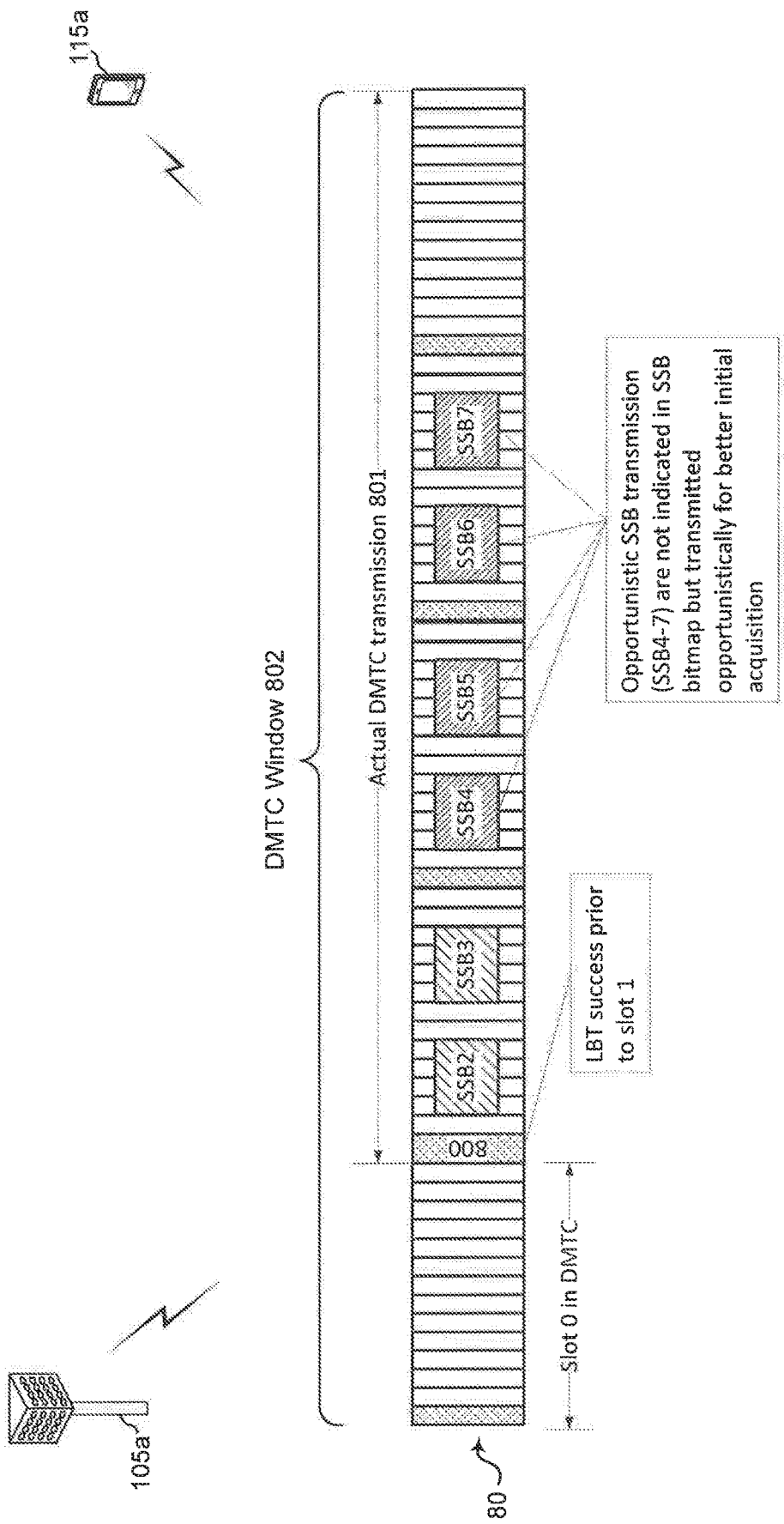
FIG. 8 is a block diagram illustrating a base station and a UE configured according to one aspect of the present disclosure.

FIG. 8 is a block diagram illustrating a base station 105a and UE 115a configured according to one aspect of the present disclosure. Base station 105 configures and signals a given number, X, of SSBs to be actually transmitted via the SSB bitmap. As above, the SSB bitmap may be communicated within the RMSI, RRC signaling, or the like. Base station 105 configures these indicated SSBs with corresponding RMSI and PRACH resources within DMTC window 802. In addition, base station 105a may elect to transmit more SSBs beyond the X SSBs indicated in the SSB bitmap. These additional SSBs are considered opportunistic and may not be committed in every DMTC window.

In transmission stream 80, base station 105a detects LBT success prior to slot 1, thereby missing transmission opportunities in slot 0. The actual DMTC transmission 801, therefore, begins at slot 1. Base station 105a may transmit an SSB bitmap of 11110000 and configure SSB0-SSB3 with RMSI and PRACH resources. However, only SSB2 and SSB3 are transmitted by base station 105a in slot 1. According to the illustrated aspect, base station 105a may transmit additional, opportunistic SSB that are not scheduled and identified in the SSB bitmap. A control signals, such as in PBCH, can indicate to UE 115a that these additional, unscheduled SSBs are "opportunistic," so there is no RMSI or no associated PRACH resources associated with them. Thus, UE 115a may detect SSB4-SSB7 in slots 2-3 In operation, there are no RMSI or PRACH resources for UE 115*a* in SSB4-SSB7. However, the detection of these opportunistic SSB allows UE 115*a* to determine that the actual scheduled SSBs are transmitted at the same frequency. Then, UE 115*a* which found the SSB, will remain in the same channel to keep searching. The opportunistic SSB4-SSB7 also provide the cell ID and timing information, which facilitate UE 115*a* to search the scheduled SSBs with their associated RMSI and PRACH. For its following searches, UE 115*a* may then use the obtained cell ID and system timing information for better SSB detection. Thus, base station 105's transmission of opportunistic SSBs result in better and faster initial acquisition.

It should be noted that there is no need to use the reserved bit in PBCH for such opportunistic SSB signaling. The reserved codepoint in the raster offset or the RMSI CORESET configuration can serve this purpose.

After a UE acquires the SSB, the UE would read the RMSI to obtain the system information. In NR, the RMSI scheduling instance may be tied to the SSB index/location in order to minimize UE search complexity. Three patterns are generally supported for the RMSI configuration: (1) SSB, CORESET, and PDSCH transmitted in time division multiplex (TDM) fashion; (2) CORESET transmitted in TDM with a frequency divisional multiplex (FDM) of SSB and PDSCH; and (3) FDM of SSB, CORESET, and PDSCH, with CORESET and PDSCH TDM in the same frequency bandwidth. Based on the detected SSB index and RMSI configuration, the UE obtains the RMSI monitoring location.

It should be noted that in LTE, SIB1 is transmitted on subframe 5/25/45/65 to minimize UE search complexity, while in MulteFire operations, SIB1 can be scheduled by the base station on any subframe in the DMTC window. In MulteFire, the UE would, therefore, keep monitoring SIB1 for every subframe within the DMTC window.

In the shared or unlicensed spectrum, as noted, the base station may perform LBT for SSB transmission. Depending on the LBT outcome, the base station may or may not be able to begin transmission of SSB as scheduled from slot 0 on the DMTC window. Typically, a UE would detect a particular SSB in one DMTC window and looks for corresponding RMSI timing configurations in the subsequent burst set(s) or transmission opportunities. However, because of the unpredictability of LBT results, a particular SSB may not be transmitted at the same time location from one DMTC window to another. Therefore, an issue may arise as to how the UE identifies the time instances in order to monitor RMSI in NR-U. Various aspects of the present disclosure are directed to monitoring for RMSI in consideration of the impact of LBT results.

Figure 9:
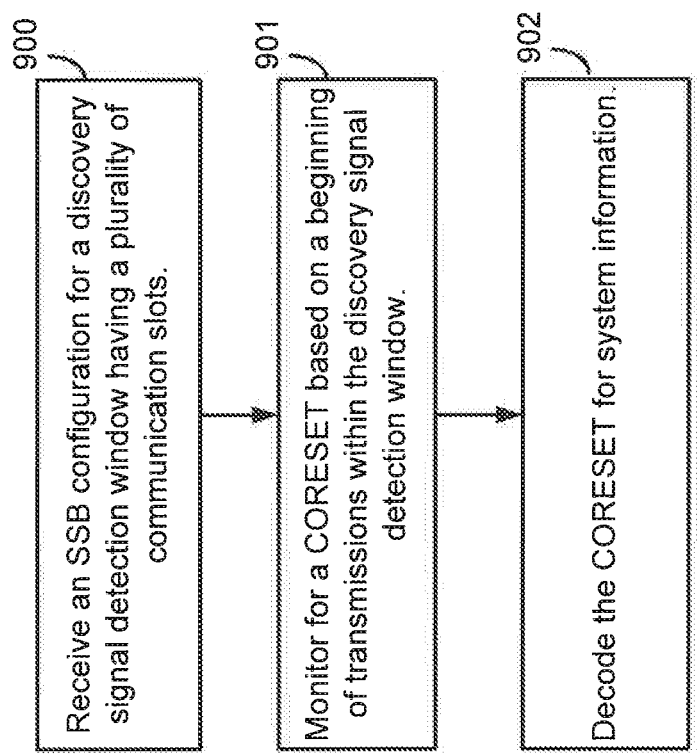
FIG. 9 is a block diagram illustrating example blocks executed to implement one aspect of the present disclosure.

FIG. 9 is a block diagram illustrating example blocks executed to implement one aspect of the present disclosure. The example blocks will also be described with respect to UE 115 as illustrated in FIG. 13. At block 900, a UE receives an SSB configuration for a discovery signal detection window having a plurality of communication slots. For example UE 115 receives the SSB configuration from the serving base station via antennas 252*a-r* and wireless radios 1300*a-r*, and then stores the information in memory 282 at SSB configuration 1401. The SSB configuration provides UE 115 the scheduled for actually transmitted SSBs within the DMTC window. UE 115 will know where to search for associated control signaling and for rate matching, as discussed above.

At block 901, the UE monitors for a CORESET based on a beginning of transmissions within the discovery signal detection window. Because of the unpredictability of LBT results, the serving base station may not always be able to begin transmissions at slot 0 of the DMTC window. UE 115, under control of controller/processor 280 executes SSB mapping logic 1303, stored in memory 282. The execution environment of SSB mapping logic 1303 implements various optional aspects that determine how SSB transmissions are performed by the serving base station. According to various optional aspects, UE 115 will monitor for the CORESET according to different measures. For example, in a first option, SSB transmission floats with the LBT results. Thus, the base station will start transmissions on the first available slot of the DMTC window with SSB0. In a next optional aspect, UE 115 would not first need to detect the beginning transmissions of the DMTC window, and, instead, UE 115 would search for every potential CORESET corresponding to all possible SSB transmissions within the DMTC window. In a next optional aspect, UE 115 also would not first need to detect the beginning transmissions of the DMTC window, and, instead, search a few potential SSB locations based on a cyclical extension of the SSB bitmap. With the cyclical extension, UE 115 would follow the bitmap as it is extended by the LBT results.

At block 902, the UE decodes the CORESET for system information. Once detected, the UE decodes the CORESET for system information. UE 115, under control of controller/processor 280, executes codec 1305, stored in memory 282 to decode the RMSI CORESET. The execution environment of codec 1305 allows the decoding of the RMSI CORESET signals to determine the system information communicated from the serving base station.

Figure 10:
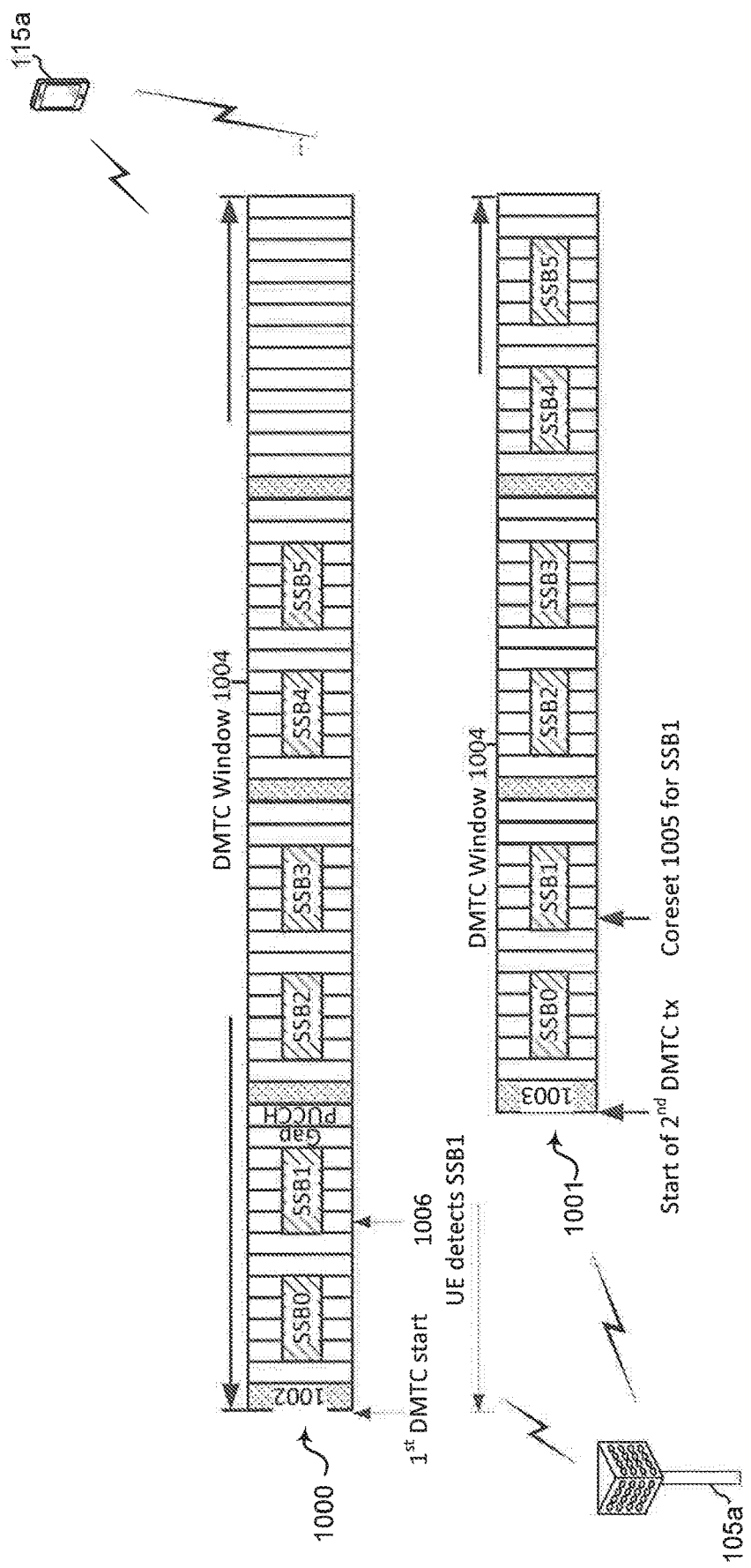
FIG. 10 is a block diagram illustrating a base station and a UE configured according to one aspect of the present disclosure.

FIG. 10 is a block diagram illustrating a base station 105*a* and a UE 115*a* configured according to one aspect of the present disclosure. In this optional aspect, base station 105*a* begins transmissions in DMTC window 1004 with SSB0 after LBT access (floating SSB transmission). The RMSI CORESET to SSB index mapping here may follow NR configuration but floats with LBT outcome. UE 115*a* would detect the SSB transmission indicator 1002 (e.g., preamble, CPDCCH) to obtain the identification of the start of transmission in DMTC window 1004. to identify the RMSI scheduling timing location.

It should be noted that the SSB transmission indicator 1002 (e.g., preamble, CPDCCH) would be beneficial to have deep penetration to reach all neighboring UEs with each beamforming direction In transmission stream 1000, operations are generally normal when base station 105*a* detects a successful LBT prior to slot 0 of DMTC window 1004. Each SSB transmission may likely be in the expected location identified in the SSB bitmap or other SSB configuration signals. UE 115*a* would detect SSB1 at 1106 with the RMSI CORESET.

In transmission stream 1001, base station 105*a* detects the successful LBT prior to slot 1 of DMTC window 1004. By floating SSB transmission with the success of LBT, UE 115*a* determines the beginning of transmissions in DMTC window 1004 by receiving SSB transmission indication 1003 (e.g, preamble, CPDCCH). Knowing the beginning of transmissions within DMTC window 1004 and that SSB transmissions float in the illustrated aspect, UE 115*a* uses the SSB configuration (e.g., SSB bitmap) to detect the RMSI CORESET at SSB1 at 1005. UE 115*a* may decode the CORESET to determine the system information for base station 105*a*.

Figure 11:
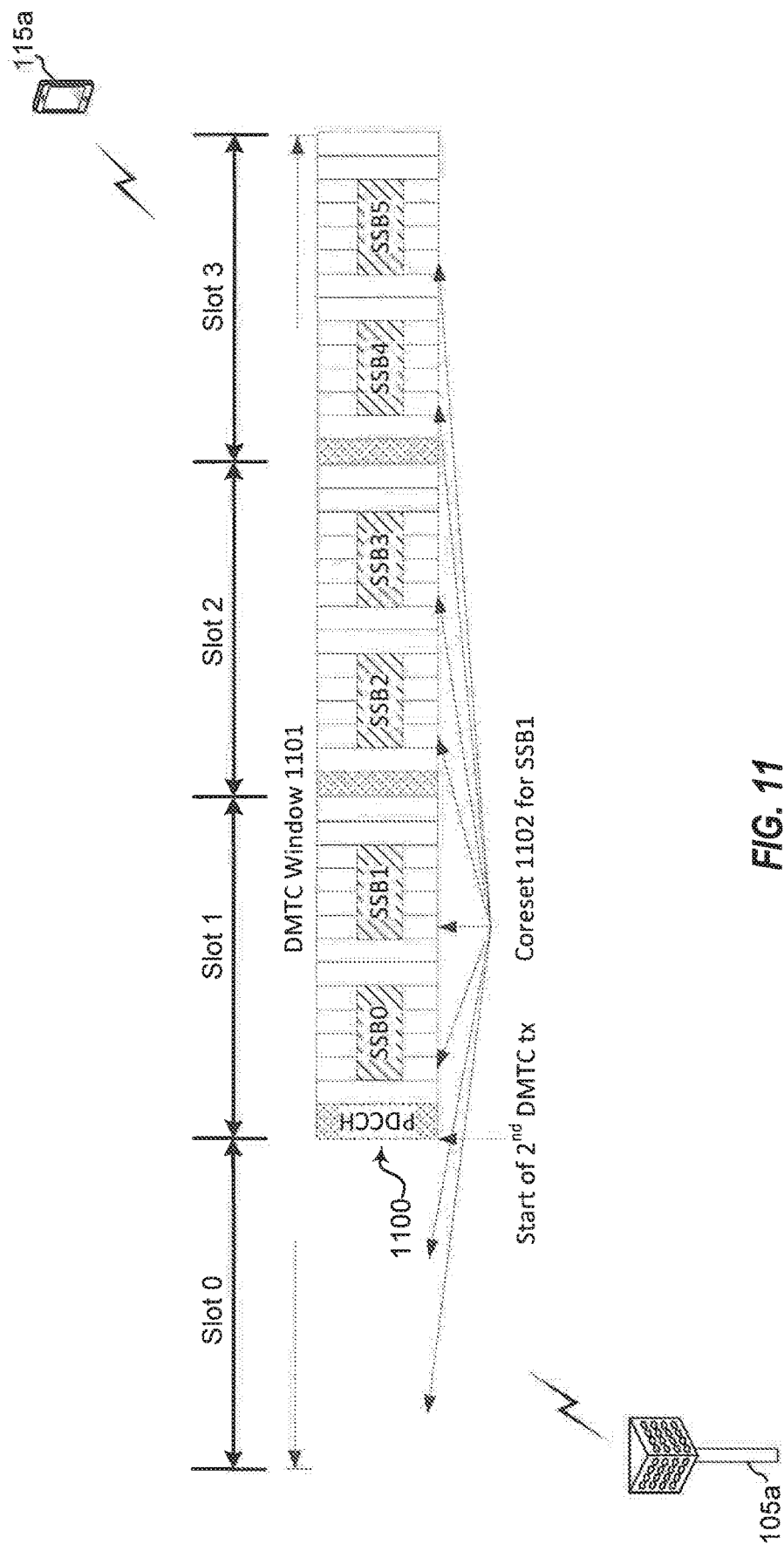
FIG. 11 is a block diagram illustrating a base station and a UE configured according to one aspect of the present disclosure.

FIG. 11 is a block diagram illustrating base station 105*a* and UE 115*a* configured according to one aspect of the present disclosure. In this optional aspect, UE 115*a* does not rely on detection of the start of transmissions within DMTC window 1101. In transmission stream 1100, base station 105*a* detects a successful LBT procedure prior to slot 1 of DMTC window 1101. Without relying on the beginning of transmissions in DMTC window 1101, UE 115*a* searches for every potential CORESET 1102 corresponding to all possible SSBs within DMTC window 1101. RMSI CORESET 1102 for each SSB follows NR configuration. Because the SSB transmissions float with the LBT outcome, and UE 115*a* does not rely on the start of transmissions within DMTC window 1101, UE 115*a* is not aware of the actual time location for each SSB from one DMTC to another. Therefore, UE 115*a* searches for all possible CORESETs 1102 associated with all SSBs within DMTC window 1101 and subsequent DMTC windows. In such optional aspect, the search complexity is increased significantly compared to NR, as UE 115*a* searches for every potential CORESET 1102 corresponding to all SSBs within DMTC window 1101, but UE 115*a* does not need to rely on the timing information for CORESET 1102 of DMTC window 1101 to locate subsequent CORESET in subsequent DMTC windows.

Figure 12:
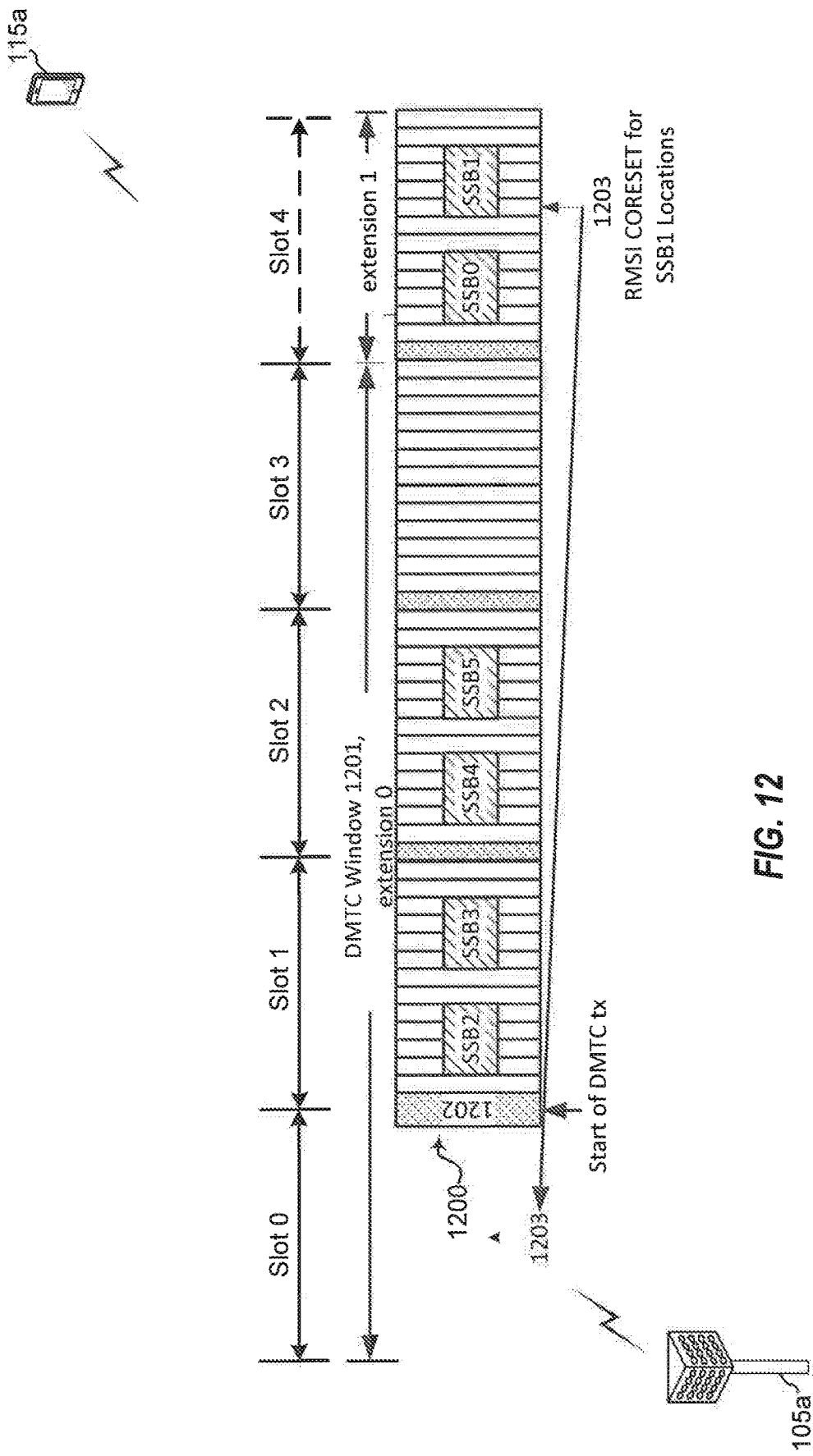
FIG. 12 is a block diagram illustrating a base station and a UE configured according to one aspect of the present disclosure.

FIG. 12 is a block diagram illustrating base station 105*a* and UE 115*a* configured according to one aspect of the present disclosure. In this optional aspect, SSB transmissions may be cyclically extended according to the LBT outcome. Base station 105*a* transmits and SSB configuration that identifies a fixed order of scheduled SSB transmissions irrespective of LBT outcome. The SSB configuration may include an SSB bitmap, resources reserved for SSB transmissions, and the like. In transmission stream 1200, base station 105*a* detects a successful LBT prior to slot 1 of DMTC window 1201. In this scenario, with no transmissions available for slot 0, the fixed order of SSB transmissions may be cyclically extended into subsequent extension slots within DMTC window 1201 when base station 105*a* is not able to access medium at the beginning of DMTC window 1201. The RMSI CORESET for each SSB follows NR configuration and is repeated on the potential cyclically extended CORESET SSB locations 1203. UE 115*a* would, therefore, search in locations 1203 either scheduled or through cyclic extension where the CORESET SSB would be expected for transmission. UE 115*a* does not rely on the start of transmission detection in DMTC window 1201.

It should be noted that in the illustrated aspect, the complexity is increased only a few times compared to NR depending on the number of SSB cyclic extensions in 5 ms. For example, with 240 Khz SCS SSB, only 1 cyclic extension may be used. Thus, the RMSI CORESET search complexity would only be doubled in such example.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 4 and 9 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   receiving, by a user equipment (UE), a synchronization signal block (SSB) configuration for a discovery signal detection window having a plurality of communication slots, wherein, based on the SSB configuration, the UE identifies time and frequency locations to monitor remaining minimum system information (RMSI) configured for each SSB;
   receiving, by the UE, an SSB transmission indicator;
   mapping, by the UE, the SSB configuration using the SSB transmission indicator to determine one or more SSB for rate matching in one or more slots of the plurality of communication slots; and
   rate matching, by the UE, data transmission around each of the one or more SSBs in the one or more slots.

2. The method of claim 1, wherein the SSB configuration includes an SSB bitmap identifying one or more actual SSB transmissions.

3. The method of claim 2, wherein the SSB bitmap is received at the UE via one of: a remaining material system information (RMSI) signal or a UE-specific radio resource control (RRC) signal.

4. The method of claim 2,
   wherein the SSB transmission indicator identifies a beginning of transmissions within the discovery signal detection window and is received via one of: a preamble, a common control signal, or a downlink grant, and
   wherein the mapping includes:
      identifying a beginning slot of the plurality of communication slots corresponding to the beginning of transmissions within the discovery signal detection window; and
      shifting a first bit of the SSB bitmap to the beginning slot to identify the one or more slots of the determined one or more SSB for rate matching.

5. The method of claim 2,
   wherein the SSB transmission indicator identifies one of: a beginning of the discovery signal detection window or a cyclical extension of the SSB bitmap according to a number of slots of the plurality of slots passed prior to the beginning of transmissions within the discovery signal detection window, and
   wherein the mapping includes:
      cyclically extending, by the UE, each bit of the SSB bitmap into a cyclically extended SSB bitmap, wherein the cyclic extension corresponds to one or more slots of the plurality of slots passed prior to the beginning of transmissions within the discovery signal detection window, and
      identifying the one or more slots of the determined one or more SSB for rate matching according to the cyclically extended SSB bitmap.

6. The method of claim 5, wherein the SSB transmission indicator is received via one of: a preamble, a common control signal, or a downlink grant.

7. The method of claim 2, further including:
   detecting, by the UE, one or more opportunistic SSB transmissions outside of the one or more slots, wherein the one or more opportunistic SSB transmissions include an opportunistic indicator indicating the one or more opportunistic SSB transmissions are outside of the one or more actual SSB transmissions identified in the SSB bitmap; and
   obtaining, by the UE, from the one or more opportunistic SSB transmissions a cell identifier (ID) and system timing associated with the one or more opportunistic SSB transmissions, wherein the SSB configuration does not have associated random access resource and RMSI for the one or more opportunistic SSB transmissions.

8. The method of claim 1,
   wherein the SSB configuration includes a set of downlink resources identifying each potential SSB location across the discovery signal detection window,
   wherein the SSB transmission indicator identifies each one of the set of downlink resources including one or more actual SSB transmissions the UE will rate match the data transmissions around, and
   wherein the mapping includes identifying the one or more slots associated with the each one of the set of downlink resources the UE will rate match SSB with the data transmissions.

9. The method of claim 8,
   wherein the set of downlink resources are grouped into one or more groups including one or more SSB resources, and
   wherein the SSB transmission indicator identifies the each one by identifying the corresponding one or more groups.

10. The method of claim 8, further including:
    detecting, by the UE, one or more opportunistic SSB transmissions outside of the each one of the set of downlink resources the UE will rate match the data transmissions around, wherein the one or more opportunistic SSB transmissions include an opportunistic indicator indicating the one or more opportunistic SSB transmissions are outside of the one or more actual SSB transmissions identified in the SSB transmission indicator; and obtaining, by the UE, from the one or more opportunistic SSB transmissions a cell identifier (ID) and system timing associated with the one or more opportunistic SSB transmissions, wherein the SSB configuration does not include random access resource and RMSI for the one or more opportunistic SSB transmissions.

11. A method of wireless communication, comprising:
receiving, by a user equipment (UE), a synchronization signal block (SSB) configuration for a discovery signal detection window having a plurality of communication slots;
monitoring, by the UE, for a control resource set (CORESET) based on a beginning of transmissions within the discovery signal detection window; and
decoding, by the UE, the CORESET for system information.

12. The method of claim 11, further including:
receiving, by the UE, an SSB transmission indicator identifying a beginning of transmissions within the discovery signal detection window, wherein the SSB configuration includes an SSB bitmap identifying one or more actual SSB transmissions, and
wherein the monitoring includes:
identifying a beginning slot of the plurality of communication slots corresponding to the beginning of transmissions within the discovery signal detection window;
shifting a first bit of the SSB bitmap to the beginning; and
monitoring for the CORESET at an associated SSB slot according to the shifted SSB bitmap.

13. The method of claim 11,
wherein the SSB configuration includes a set of downlink resources identifying each potential SSB location across the discovery signal detection window,
wherein the monitoring includes:
searching for the CORESET at each of the set of downlink resources identifying each potential SSB location.

14. The method of claim 11,
wherein the SSB configuration includes an SSB bitmap identifying one or more actual SSB transmissions scheduled within the discovery signal detection window, and
wherein the monitoring includes:
searching for the CORESET at an scheduled SSB location identified by the SSB bitmap, and at a cyclically extended version of the scheduled SSB location when the CORESET is not detected at the scheduled SSB location.

15. An apparatus configured for wireless communication, the apparatus comprising:
at least one processor; and
a memory coupled to the at least one processor,
wherein the at least one processor is configured:
to receive, by a user equipment (UE), a synchronization signal block (SSB) configuration for a discovery signal detection window having a plurality of communication slots, wherein, based on the SSB configuration, the UE identifies time and frequency locations to monitor remaining minimum system information (RMSI) configured for each SSB;
to receive, by the UE, an SSB transmission indicator;
to map, by the UE, the SSB configuration using the SSB transmission indicator to determine one or more SSB for rate matching in one or more slots of the plurality of communication slots; and
to rate match, by the UE, data transmission around each of the one or more SSBs in the one or more slots.

16. The apparatus of claim 15, wherein the SSB configuration includes an SSB bitmap identifying one or more actual SSB transmissions.

17. The apparatus of claim 16, wherein the SSB bitmap is received at the UE via one of: a remaining material system information (RMSI) signal or a UE-specific radio resource control (RRC) signal.

18. The apparatus of claim 16,
wherein the SSB transmission indicator identifies a beginning of transmissions within the discovery signal detection window and is received via one of: a preamble, a common control signal, or a downlink grant, and
wherein the configuration of the at least one processor to map includes configuration of the at least one processor:
to identify a beginning slot of the plurality of communication slots corresponding to the beginning of transmissions within the discovery signal detection window; and
to shift a first bit of the SSB bitmap to the beginning slot to identify the one or more slots of the determined one or more SSB for rate matching.

19. The apparatus of claim 16,
wherein the SSB transmission indicator identifies one of: a beginning of the discovery signal detection window or a cyclical extension of the SSB bitmap according to a number of slots of the plurality of slots passed prior to the beginning of transmissions within the discovery signal detection window, and
wherein the configuration of the at least one processor to map includes configuration of the at least one processor:
to cyclically extend, by the UE, each bit of the SSB bitmap into a cyclically extended SSB bitmap, wherein the cyclic extension corresponds to one or more slots of the plurality of slots passed prior to the beginning of transmissions within the discovery signal detection window, and
to identify the one or more slots of the determined one or more SSB for rate matching according to the cyclically extended SSB bitmap.

20. The apparatus of claim 19, wherein the SSB transmission indicator is received via one of: a preamble, a common control signal, or a downlink grant.

21. The apparatus of claim 16, further including configuration of the at least one processor:
to detect, by the UE, one or more opportunistic SSB transmissions outside of the one or more slots, wherein the one or more opportunistic SSB transmissions include an opportunistic indicator indicating the one or more opportunistic SSB transmissions are outside of the one or more actual SSB transmissions identified in the SSB bitmap; and
to obtain, by the UE, from the one or more opportunistic SSB transmissions a cell identifier (ID) and system timing associated with the one or more opportunistic SSB transmissions, wherein the SSB configuration does not have associated random access resource and RMSI for the one or more opportunistic SSB transmissions.

22. The apparatus of claim 15,
wherein the SSB configuration includes a set of downlink resources identifying each potential SSB location across the discovery signal detection window,
wherein the SSB transmission indicator identifies each one of the set of downlink resources including one or more actual SSB transmissions the UE will rate match the data transmissions around, and
wherein the configuration of the at least one processor to map includes configuration to identify the one or more slots associated with the each one of the set of downlink resources the UE will rate match SSB with the data transmissions.

23. The apparatus of claim 22,
wherein the set of downlink resources are grouped into one or more groups including one or more SSB resources, and
wherein the SSB transmission indicator identifies the each one by identifying the corresponding one or more groups.

24. The apparatus of claim 22, further including configuration of the at least one processor:
to detect, by the UE, one or more opportunistic SSB transmissions outside of the each one of the set of downlink resources the UE will rate match the data transmissions around, wherein the one or more opportunistic SSB transmissions include an opportunistic indicator indicating the one or more opportunistic SSB transmissions are outside of the one or more actual SSB transmissions identified in the SSB transmission indicator; and
to obtain, by the UE, from the one or more opportunistic SSB transmissions a cell identifier (ID) and system timing associated with the one or more opportunistic SSB transmissions, wherein the SSB configuration does not include random access resource and RMSI for the one or more opportunistic SSB transmissions.

25. An apparatus configured for wireless communication, the apparatus comprising:
at least one processor; and
a memory coupled to the at least one processor,
wherein the at least one processor is configured:
to receive, by a user equipment (UE), a synchronization signal block (SSB) configuration for a discovery signal detection window having a plurality of communication slots;
to monitor, by the UE, for a control resource set (CORESET) based on a beginning of transmissions within the discovery signal detection window; and
to decode, by the UE, the CORESET for system information.

26. The apparatus of claim 25, further including configuration of the at least one processor:
to receive, by the UE, an SSB transmission indicator identifying a beginning of transmissions within the discovery signal detection window, wherein the SSB configuration includes an SSB bitmap identifying one or more actual SSB transmissions, and
wherein the configuration of the at least one processor to monitor include configuration of the at least one processor s:
to identify a beginning slot of the plurality of communication slots corresponding to the beginning of transmissions within the discovery signal detection window;
to shift a first bit of the SSB bitmap to the beginning; and
to monitor for the CORESET at an associated SSB slot according to the shifted SSB bitmap.

27. The apparatus of claim 25,
wherein the SSB configuration includes a set of downlink resources identifying each potential SSB location across the discovery signal detection window,
wherein the configuration of the at least one processor to monitor includes configuration to search for the CORESET at each of the set of downlink resources identifying each potential SSB location.

28. The apparatus of claim 25,
wherein the SSB configuration includes an SSB bitmap identifying one or more actual SSB transmissions scheduled within the discovery signal detection window, and
wherein the configuration of the at least one processor to monitor includes configuration to search for the CORESET at an scheduled SSB location identified by the SSB bitmap, and at a cyclically extended version of the scheduled SSB location when the CORESET is not detected at the scheduled SSB location.

* * * * *